United States Patent [19]
Correa et al.

[11] Patent Number: 5,280,270
[45] Date of Patent: Jan. 18, 1994

[54] BOAT DISTRESS APPARATUS AND METHOD

[76] Inventors: Luis F. Correa, 820 E. 41st St., Suite 201, Hialeah, Fla. 33013; Adel M. Abunassar, 201 SW. 22nd Rd., Miami, Fla. 33129; Mohammed Kahuk, 346 NW. 103rd Ter., Pembroke Pines, Fla. 33326

[21] Appl. No.: 957,904
[22] Filed: Oct. 8, 1992
[51] Int. Cl.⁵ .................. B60Q 9/00; B63B 45/04
[52] U.S. Cl. .................. 340/471; 40/541; 340/984
[58] Field of Search ............ 116/209; 359/515, 528; 340/471, 473, 485, 486, 574, 984; 40/582, 583

[56] References Cited

U.S. PATENT DOCUMENTS

| | | | |
|---|---|---|---|
| 2,115,906 | 5/1938 | Dickson et al. | 359/528 |
| 3,226,707 | 12/1965 | Newman et al. | 340/486 |
| 3,255,725 | 6/1966 | Von Kreidner et al. | 359/528 X |
| 3,952,694 | 4/1976 | McDonald | 116/209 |
| 4,240,220 | 12/1980 | Smith | 40/582 X |
| 4,772,990 | 9/1988 | Linehan et al. | 340/473 X |
| 4,879,965 | 11/1989 | Valley | 116/209 |
| 4,922,223 | 5/1990 | Prevot | 340/471 X |

*Primary Examiner*—Daniel M. Yasich
*Attorney, Agent, or Firm*—Robert J. Van Der Wall

[57] ABSTRACT

An emergency signalling includes a sheet having an optically reflective face, for spreading upon an essentially horizontal surface, such that the optically reflective face is directed essentially upward. The sheet preferably has an emergency message on the optically reflective face in nonreflective letters. The apparatus also preferably includes a strobe light positioned on the sheet, an electric circuit, and an electric power source connected through the electric circuit to the strobe light. There is preferably a switch in the electric circuit for controlling the flow of electric current from the electric power source to the strobe light, and an optical sensor for operating the switch, such that the optical sensor closes the switch when light strikes the optical sensor and opens the switch no light strikes the optical sensor. The apparatus also preferably includes an upwardly directed light source, an electric circuit, and an electric power source connected through the electric circuit to the upwardly directed light source. A photovoltaic cell is preferably provided for recharging the electric power sources by converting light into electricity. A method is provided for signalling that an emergency exists, including the step of spreading an optically reflective sheet over an essentially horizontal surface, to reflect light and draw attention to a location.

17 Claims, 4 Drawing Sheets

BOAT DISTRESS APPARATUS AND METHOD

BACKGROUND OF THE INVENTION

1. Field of the Invention

The present invention relates generally to the field of emergency signalling devices, and more specifically to a combination emergency signalling apparatus for use on boats, including an optically reflective sheet for spreading over the top of a bimini top frame or a cabin, having embossed upon its upper surface a distress message, such as SOS, in nonreflective letters, a strobe light mounted at the center of the sheet and connected to a power source and to a timer assembly to flash a distress message in Morse code, and at least one upwardly directed light also connected to the power source and to a timer to flash a Morse code distress message, which is preferably connected to an optical sensor switch assembly to turn the light on at night, and optionally connected to a photovoltaic cell for recharging the power source by day.

2. Description of the Prior Art

There have long been emergency signalling devices for use on boats and ships. The history of maritime distress signals would necessarily begin contemporaneously with man's first journeys onto a bodies of water aboard buoyant objects. The first ships are believed to have been floating logs that carried prehistoric man across lakes and rivers. During the Stone Age, which began about 1,000,000 B.C., man learned to hollow out the logs using stone axes and fire. Distress signals in these early days were probably limited to frantic hand gestures and cries for help. By 3000 B.C. the island of Crete maintained a large fleet of open vessels propelled by oars known as galleys, to trade with nations bordering on the Mediterranean Sea. During this period, the Egyptians were navigating the Nile River in boats made of tied bundles of reeds. Within the next millennium, the Egyptians were building ships out of planks imported from Phoenicia. By 1000 B.C., the Phoenicians themselves dominated Mediterranean trade, followed by the Greeks and Romans. After the Crusades, ships became wider and deeper and more sails were added. The developments eventually led to the caravel design, then to the galleon in the 1500's and the clipper ship in the 1800's. Steam was successfully harnessed to propel ships by James Watt in the 1700's, and was eventually replaced with the internal combustion engine.

During the evolution of seafaring, there was a parallel evolution in the nature and technology of marine distress signals. Man learned to shout through primitive megaphones, to flash lights and, with the advent of steam power, to sound the fog horn, the whistle and the siren. Various flags were flown or waved, such as in Semaphore signals, and flares and other fireworks were launched. The twentieth century brought the wide use of radio to marine travel.

These methods have all failed at various times. The Titanic launched flares and radioed for help. Yet the nearest ship, the Californian, is believed to have had its wireless receiver shut off and to have initially ignored the flares. Techniques for protecting ships have improved since then, so that today help can be quickly and reliably summoned.

Developing distress signalling means for small boats has, however, presented unique problems. The signalling apparatus must be relatively compact and inexpensive. A problem with the flare is that it only generates a signal for a few seconds. The siren can operate continuously, but is limited by the relatively short range of the sound it generates. Search pilots, for example, would not likely hear a siren. As for radio, most small boats are not equipped with transmitters, and humid, salty air limits reliability.

Other devices have been developed as well, but present their own disadvantages. Todd, U.S. Pat. No. 4,987,848, issued on Jan. 29, 1991, discloses a radar reflecting signal flag. The flag is made of durable, synthetic threads, and has the outward appearance of a conventional flag or pennant flown on boats. The synthetic threads are, however, impregnated with metallic particles to reflect radar waves and indicate the location of the boat. A problem with Todd is that the flag is intended to be flown at all times, so that its deployment does not alert anyone to an emergency. Another problem is that radar detection is only moderately reliable at such a low elevation. Still another problem is that, search planes generally do not have radars responsive to this type of signal, and ships, which do, are too slow; therefore, the flag would rarely be helpful.

Rowland, U.S. Pat. No. 4,813,025, issued on Mar. 14, 1989, teaches a nautical signalling device using radio and ultrasonic waves. Interrogation signals are transmitted to the boat through both air and water, and automatically trigger the generation of a response signal from the unit on the boat. The elapsed time from transmission to reception and the direction of response signals are recorded and used to locate the missing boat. A problem with Rowland is that the device is dependant upon complex and sophisticated electronics to an extent that it would likely be prone to failure for a myriad of reasons. The salt environment would certainly aggravate this problem. The complexity may also make Rowland expensive beyond the means of the typical small boat owner.

Kolesar, U.S. Pat. No. 4,809,638, issued on Mar. 7, 1989, reveals a liquid film material carried by a floating survivor in a packet for deployment on the surface of the water around him. This film material contains an ingredient for reducing water surface tension to eliminate capillary waves. A second ingredient reduces evaporation. The combined effect is supposed to reduce radar back-scatter in comparison with the surrounding water and make the slick both visible to the eye and to radar. A problem with Kolesar is that it is intended for use by a survivor floating in the water, and is not well suited for drawing attention to a boat in distress. The boat itself could block reflection from the slick, and the slick may appear from the air to be nothing more than discharge from the boat engines.

Bien, U.S. Pat. No. 4,053,233, issued on Oct. 11, 1977, teaches another type of signalling reflector. The invention is a small multifaceted object, having a retroreflector on each facet, and attached to a stem member for mounting on a boat, on a survivor's clothing, on his life raft or his life preserver. Each retroreflector is supposed to be able to reflect at 180 degrees a laser beam or other radiated signal. A problem with Bien is that, unless a nearby search vessel already knows the boat is in trouble and has its search signals activated, the boat's distress will go unnoticed. Bien also depends on the search vessel being equipped with the necessary signalling equipment.

McDonald, U.S. Pat. No. 3,952,694, issued on Apr. 27, 1976, discloses a marine signalling device in the form of a broad surfaced member connected to a boat or person, such as a length of plastic sheeting. The sheeting is formed of a buoyant material which is colored to contrast with the water, and is unfolded to float upon the surface of the water and trail from the stranded boat or person. A problem with McDonald is that its deployment could take large amounts critical time. Furthermore, the current could carry it back to wrap around the hull of the boat. And should it be mishandled, it may break loose and float away. Finally, it is only minimally effective at night.

Bearing in mind the foregoing, it is a principal object of the present invention to provide a marine signalling apparatus which can be rapidly deployed and reliably secured.

Another object of the present invention is to provide such an apparatus which is relatively inexpensive to make and easy to use.

A further object of the present invention is to provide such an apparatus which operates effectively during both day and night.

An additional object of the present invention is to provide such an apparatus which is not merely detectable but which also clearly communicates distress.

SUMMARY OF THE INVENTION

The present invention accomplishes the above-stated objectives, as well as others, as may be determined by a fair reading and interpretation of the entire specification.

An emergency signalling apparatus is provided, including a sheet having an optically reflective face, for spreading upon an essentially horizontal surface, such that the optically reflective face is directed essentially upward. The sheet preferably has an emergency message on the optically reflective face in nonreflective letters. The apparatus also preferably includes a strobe light positioned on the sheet, an electric circuit, and an electric power source connected through the electric circuit to the strobe light. There is preferably a switch in the electric circuit for controlling the flow of electric current from the electric power source to the strobe light, and an optical sensor for operating the switch, such that the optical sensor closes the switch when light strikes the optical sensor and opens the switch no light strikes the optical sensor. Where the sheet has an edge, a tubular housing is preferably included for containing the sheet in rolled configuration, the tubular housing having a longitudinal slot through which the edge of the sheet can pass, such that the sheet can be unrolled and deployed by pulling the edge away from the tubular housing. Loops preferably extend from the tubular housing for engaging secured hooks to anchor the tubular housing. A loop also preferably extends from the edge of the sheet for gripping while pulling the edge away from the tubular housing to deploy the sheet. The apparatus also preferably includes an upwardly directed light source, an electric circuit, and an electric power source connected through the electric circuit to the upwardly directed light source. A switch is also preferably provided in the electric circuit for controlling the flow of electric current from the electric power source to the upwardly directed light source, and an optical sensor for operating the switch, such that the optical sensor closes the switch when light strikes the optical sensor and opens the switch when no light strikes the optical sensor. Several upwardly directed light sources may be provided and arranged to spell out a distress message. A photovoltaic cell is preferably provided for recharging the electric power sources by converting light into electricity. A tubular storage vessel is optionally provided for containing the tubular housing when the apparatus is not in use, and is preferably made of a buoyant material and preferably includes a handle member attached to the tubular storage vessel.

An emergency signalling apparatus is also provided, including an electric light source, an electric power source, an electric circuit, a switch for controlling the flow of electric current from the electric power source through the electric circuit to the electric light source, and a mechanism for automatically operating the switch in such a manner that the electric light source flashes a distress signal in a coded sequence.

A method is provided for signalling that an emergency exists, including the step of spreading an optically reflective sheet over an essentially horizontal surface, to reflect light and draw attention to a location. The method preferably further includes the steps of positioning an upwardly directed strobe light and strobe light circuit on the optically reflective sheet, and passing electricity through the circuit and strobe light.

A method is provided for signalling that an emergency exists, using a signalling apparatus including an optically reflective sheet having an edge and a tubular housing containing the optically reflective sheet in a rolled configuration and having a longitudinal slot through which the edge can pass, including the steps of placing the tubular housing at a location adjacent to a desired sheet deployment surface, and pulling a length of the sheet out of the housing through the slot so that the length of the sheet rests on the deployment surface. Where the tubular housing has an exterior surface and loops are attached to the exterior surface, the method further includes the step of securing the loops at a location adjacent to the deployment surface. An optional further step is that of arranging plurality of upwardly directed light sources on the optically reflective sheet to spell out a distress message.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
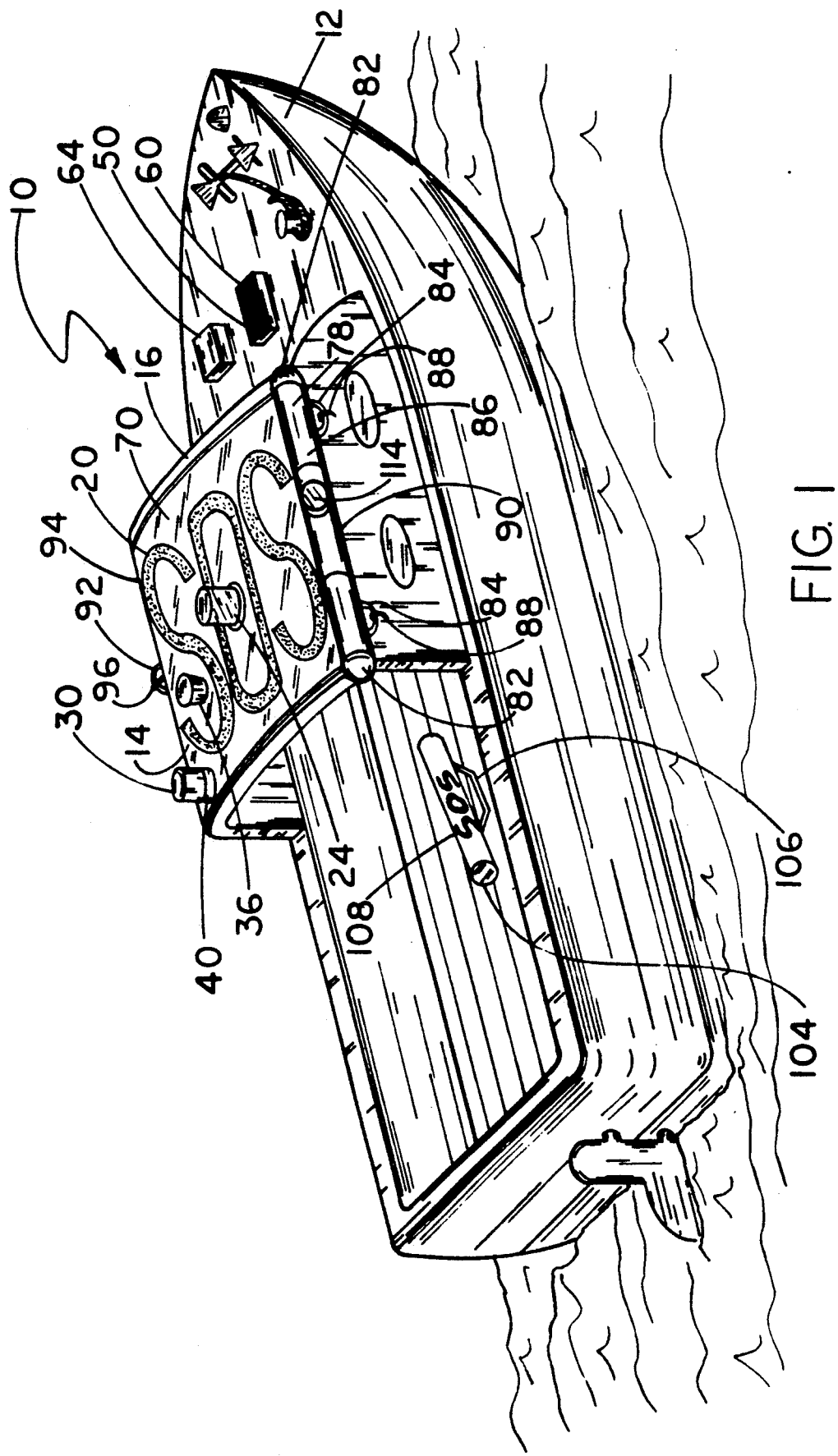
FIG. 1 is a perspective view of a boat having a cabin, and equipped with the preferred embodiment of the inventive apparatus. The strobe light and a single upwardly directed light are shown.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
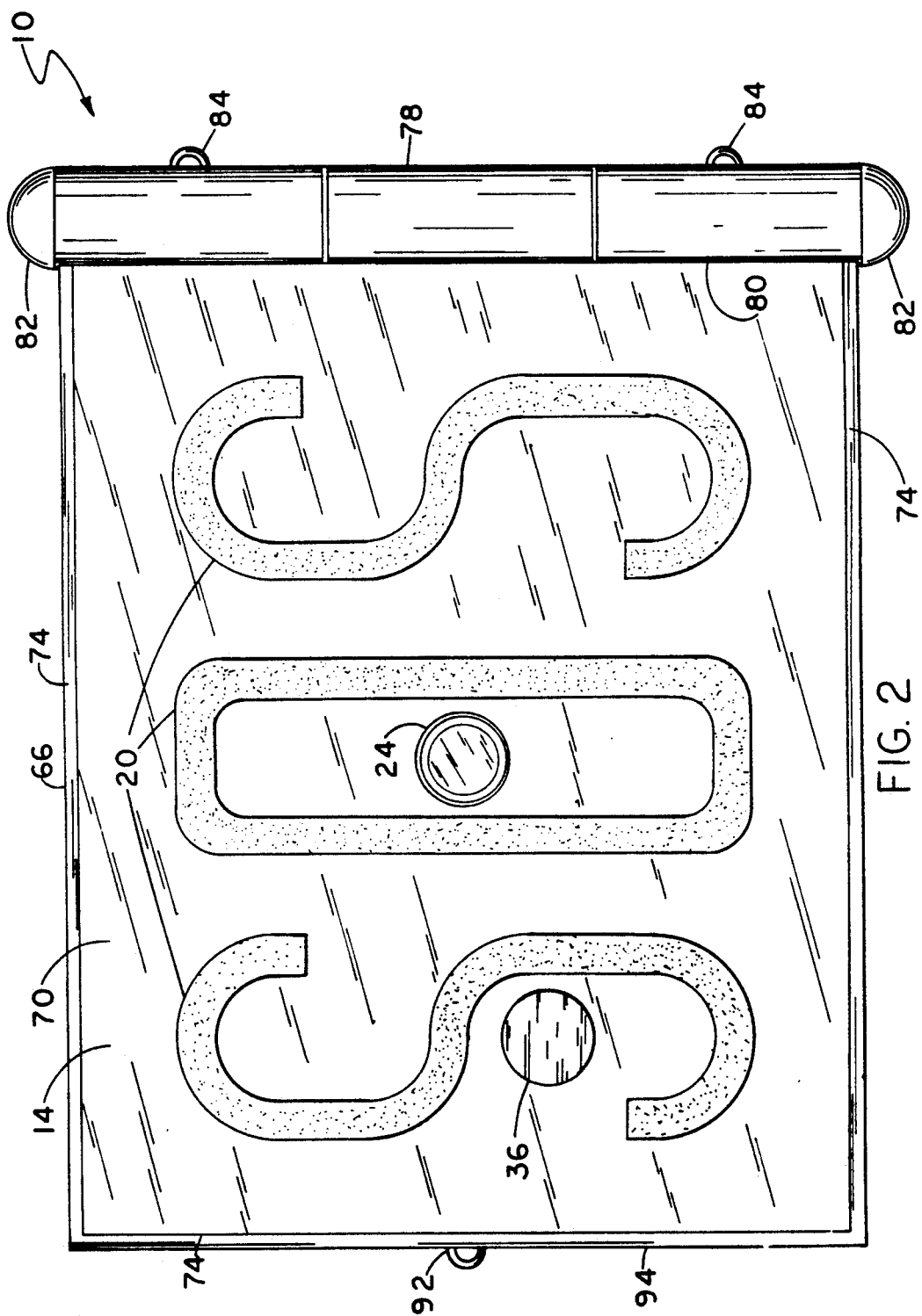
FIG. 2 is a top view of the apparatus of FIG. 1.

Referring to FIGS. 1 and 2, an emergency signalling apparatus 10 for use on boats 12 is disclosed. Apparatus 10 includes an optically reflective sheet 14 for spreading over a bimini top frame or the top 16 of a cabin, having nonreflective distress letters 20 such as "SOS" embossed upon its upper face 22. A strobe light 24 is preferably mounted at the center of sheet 14 and connected to a timer assembly 30 to flash a distress signal, such as "SOS", in Morse code. At least one upwardly directed light 36 is also preferably provided and connected to a timer assembly 40 to flash a Morse code distress signal. A plurality of upwardly directed lights 36 may be arranged to spell out a distress message such as "SOS". Apparatus 10 is preferably connected to an optical sensor-switch assembly 50 to turn light 36 on at night and off during daytime. A photovoltaic cell 60 is preferably provided for recharging the apparatus 10 power source 64 by day.

Figure 3:
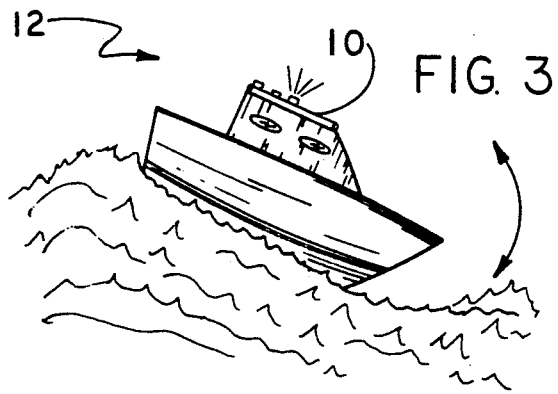
FIGS. 3, 3a and 3b are illustrations of a boat equipped with the inventive apparatus, pitching, rolling and yawing, respectively.
Figure 3A:
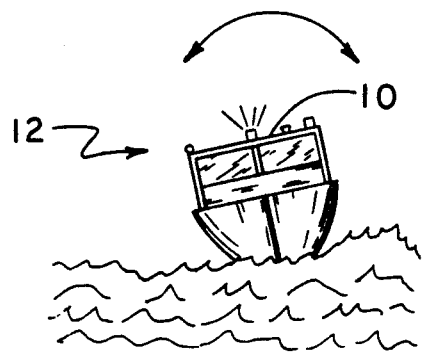
Figure 3B:
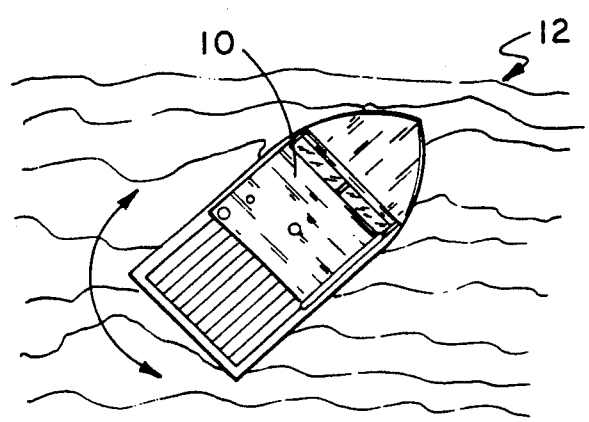

Reflective sheet 14 includes a durable bottom layer 66 made of a suitable fabric and covered with a top layer 70 an optically highly reflective material. Bottom layer 66 and top layer 70 are both preferably fire-proof and are joined together at netted edges 74. See FIG. 2. Top layer 70 serves to reflect rays of sunlight in random directions as the boat pitches, rolls and yaws, see FIG. 3, and may be formed of any suitable commercially available plastic. Prototype testing has shown that such a sheet 14, measuring four feet by five feet, can be seen by an airplane at altitudes as high as five thousand feet. The inclusion of a distress message such as SOS in nonreflective letters 20 is optional and preferred.

Figure 4:
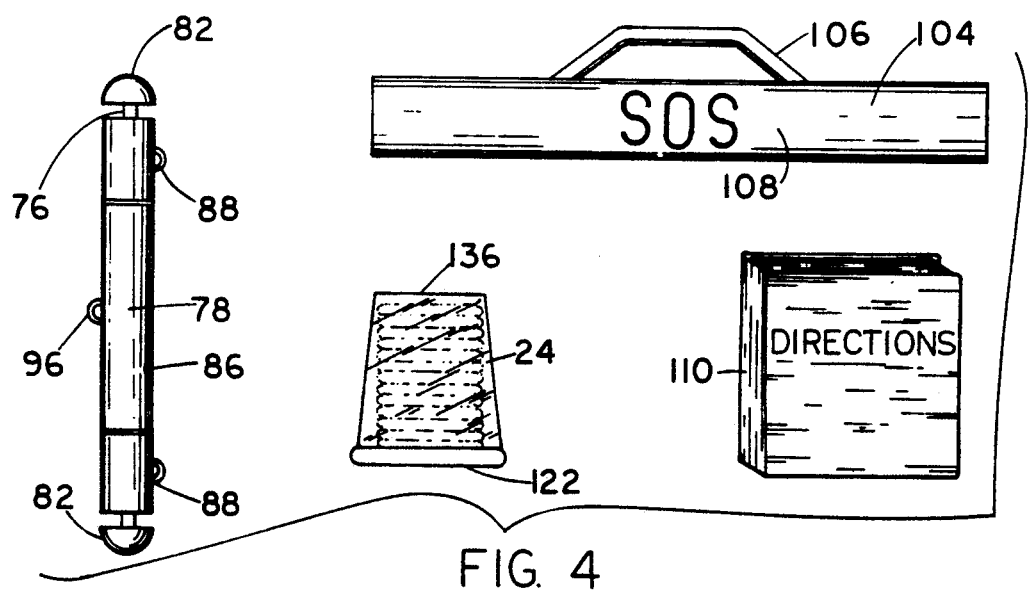
FIG. 4 is a side view of the tubular housing containing the reflective sheet, the sheet being rolled up inside the housing, shown together with the optional strobe light, directions manual, and storage vessel. Housing and sheet edge loops are illustrated.

Sheet 14 is spooled around a spindle member 76 inside a longitudinally slotted tubular housing 78 for storage and is unrolled through slot 80 for deployment. A cap 82 is provided at each end of slotted tubular housing 78 and two loops 84 extend from the side 86 of tubular housing 78 opposite longitudinal slot 80. Loops 84 are engaged by hooks 88 on an edge 90 of cabin top 16 or on a member on a Bimini top frame. See FIG. 4. A third loop 92 is provided at the leading edge 94 of sheet 14, projecting through slot 80. Sheet 14 is deployed through slot 80 by pulling loop 92, much as a classroom projector screen is pulled by a loop out of its canister. Loops 84 and hooks 88 hold tubular housing 78 in place during deployment, and loop 92 is fitted over a third hook 96. A spring mechanism (not shown) may be provided inside tubular housing 78 for automatically retracting sheet 14 into a rolled position. A releasable catch (not shown) may also be provided for holding sheet 14 in an unrolled position against the biasing of the spring mechanism. A tubular storage vessel 104 for slotted tubular housing 78 has a carrying handle 106 and the letters "SOS" printed on its side 108. Storage vessel 104 may also contain strobe light 24 and a directions manual 110. See FIG. 4. A radio beacon 114 may optionally be attached to slotted tubular housing 78.

Strobe light 24 is preferably placed at the center of the "O" in the optional "SOS" message on sheet 14 after deployment. In this way strobe light 24 not only flashes a distress message but also helps illuminate sheet 14 at night. Strobe light 24 is connected to a power source 124 and includes a base member 122 for attachment to sheet 14, and perhaps to cabin top 16. See FIG. 5. Timer assembly 30 for switching strobe light 24 on and off fits on top of power supply 124. Assembly 30 includes a so-called intelligent source, such as a computer chip, to cause light 24 to flash either in simple repetition or in complex code. See FIG. 6 for one embodiment of the assembly 30 circuitry 128. Circuitry 128 is sealed and assembly 30 is designed by well-known means to withstand vibration and impact for maximum reliability. Timer assembly 30 preferably signals in Morse code. A strobe tube 130 fits onto assembly 30, and a colored lens 132, preferably red, fits over strobe tube 130. The surface of colored lens 132 is preferably irregular so that diffused light is emitted. Finally, a protective outer dome 136 fits over lens 132, and attaches to the outer rim 138 of base member 122.

Figures 5, 6:
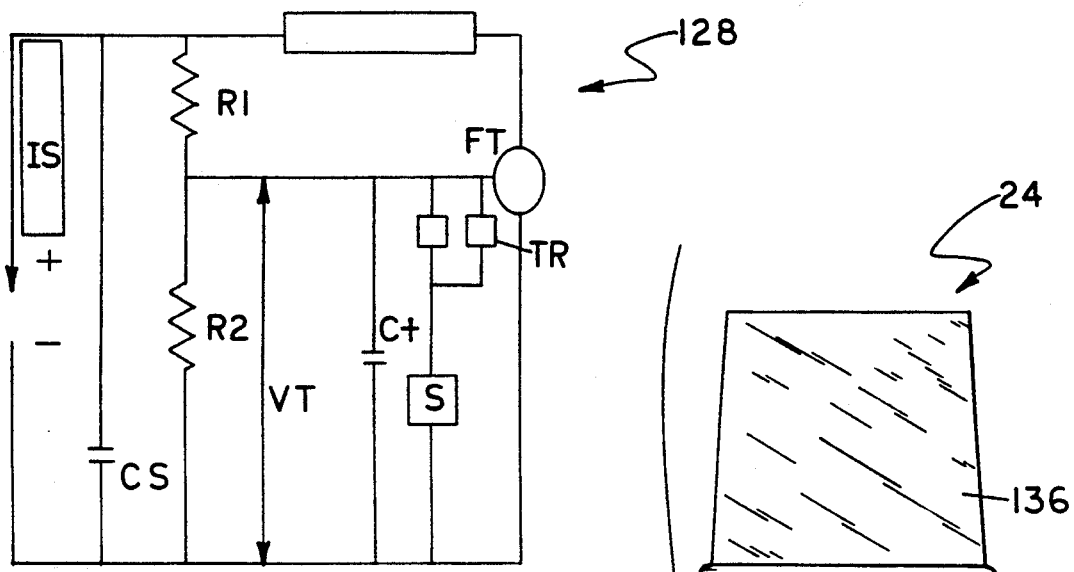
FIG. 5 is an exploded view of the strobe light assembly.
FIG. 6 is a diagram of the timer assembly circuit for controlling the operation of the strobe light.

In FIG. 5, the symbols used have the following meanings: V indicates the DC operating voltage, $C_s$ is an energy storage capacitor, $R_1$ and $R_2$ are resistors used for dividing voltage, C+ is a trigger capacitor, Tr is a trigger coil, S is a switch, Ft is a flash tube and IS means intelligent source.

Upwardly directed light 36 may be any of many commercially available high intensity light sources. Optical sensor-switch assembly 50 and photovoltaic cell 60 also can be any of several commercially available types.

It is to be understood that apparatus 10 can also be used on life rafts, life boats, land vehicles and on the land itself, by hikers and campers.

Method

In practicing the invention, the following method may be used. An optically reflective sheet 14 is spread over a horizontal surface, such as on part of a vehicle. The method preferably further includes the steps of positioning an upwardly directed strobe light and strobe light circuit on optically reflective sheet 14, and passing electricity through the circuit and strobe light.

Another method is provided for signalling that an emergency exists, using a signalling apparatus 10 including an optically reflective sheet 14 having an edge 94 and a tubular housing 78 containing optically reflective sheet 14 in a rolled configuration and having a longitudinal slot 80 through which edge 94 can pass, including the steps of placing tubular housing 78 at a location adjacent to a desired sheet 14 deployment surface, and pulling a length of sheet 14 out of housing 78 through slot 80 so that the length of sheet 14 rests on the deployment surface. Where the tubular housing 78 has an exterior surface and loops 84 are attached to the exterior surface, the method further includes the step of securing loops 84 at a location adjacent to the deployment surface. An optional further step is that of arranging a plurality of upwardly directed light sources 36 on the optically reflective sheet 14 to spell out a distress message.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A method for signalling that an emergency exists, comprising the steps of:
   spreading an optically reflective sheet over an essentially horizontal surface, to reflect light and draw attention to a location;
   positioning an upwardly directed strobe light and strobe light circuit on said optically reflective sheet;
   passing electricity through said circuit and strobe light.

2. The method of claim 1, using an additional signalling apparatus comprising an optically reflective sheet having an edge and a tubular housing containing said optically reflective sheet in a rolled configuration and having a longitudinal slot through which said edge can pass, comprising the additional steps of:
   placing said tubular housing at a location adjacent to a desired sheet deployment surface;
   pulling a length of said sheet out of said housing through said slot so that said length of said sheet rests on said deployment surface.

3. The method of claim 2, wherein said tubular housing has an exterior surface and loop means attached to said exterior surface, further comprising the step of:
   securing said loop means at a location adjacent to said deployment surface.

4. The method of claim 1, further comprising the step of:
   arranging a plurality of upwardly directed light sources on said optically reflective sheet to spell out a distress message.

5. An emergency signalling apparatus, comprising:
   a sheet having an optically reflective face, for spreading upon an essentially horizontal surface, such that said optically reflective face is directed essentially upward;
   a strobe light positioned on said sheet;
   an electric circuit;
   an electric power source connected through said electric circuit to said strobe light;
   a switch in said electric circuit for controlling the flow of electric current from said power source to said strobe light; and
   optical sensor means for operating said switch, such that said optical sensor means closes said switch when light strikes said optical sensor means and opens said switch no light strikes said optical sensor means.

6. The apparatus of claim 5, wherein said sheet has an emergency message on said optically reflective face in nonreflective letters.

7. The apparatus of claim 5, wherein said sheet has an edge, further comprising:
   a tubular housing for containing said sheet in rolled configuration, said tubular housing having a longitudinal slot through which said edge of said sheet can pass, such that said sheet can be unrolled and deployed by pulling said edge away from said tubular housing.

8. The apparatus of claim 7 further comprising:
   loop means extending from said tubular housing for engaging securing hooks to anchor said tubular housing.

9. The apparatus of claim 7 further comprising:
   loop means extending from said edge of said sheet for gripping while pulling said edge away from said tubular housing to deploy said sheet.

10. The apparatus of claim 7 further comprising:
    a tubular storage vessel for containing said tubular housing when said apparatus is not in use.

11. The apparatus of claim 10, wherein said tubular storage vessel is made of a buoyant material.

12. The apparatus of claim 10 further comprising a handle member attached to said tubular storage vessel.

13. The apparatus of claim 5 further comprising:
    a photovoltaic cell for recharging said electric power source by converting light into electricity.

14. The apparatus of claim 5, additionally comprising:
    a second switch for controlling the flow of electric current from said electric power source through said circuit to said strobe light source; and
    means for automatically operating said second switch in such a manner that said strobe light source flashes a distress signal in a coded sequence.

15. An emergency signalling apparatus, comprising:
    a sheet having an optically reflective face, for spreading upon an essentially horizontal surface, such that said optically reflective face is directed essentially upward;
    an upwardly directed light source;
    an electric circuit;
    an electric power source connected through said electric circuit to said upwardly directed light source;
    a switch in said electric circuit for controlling the flow of electric current from said electric power source to said upwardly directed light source; and
    optical sensor means for operating said switch, such that said optical sensor means closes said switch when light strikes said optical sensor means and opens said switch when no light strikes said optical sensor means.

16. The apparatus of claim 15, wherein a plurality of said upwardly directed light sources are provided and arranged to spell out a distress message.

17. The apparatus of claim 15 further comprising:
    a photovoltaic cell for recharging said electric power source by converting light into electricity.

* * * * *